US012780161B2

(12) United States Patent
Chavrier et al.

(10) Patent No.: US 12,780,161 B2
(45) Date of Patent: Nov. 3, 2026

(54) METHOD OF OPERATING A VEHICLE FEEDING MATERIAL TO A ROAD FINISHING MACHINE

(71) Applicant: VOLVO TRUCK CORPORATION, Gothenburg (SE)

(72) Inventors: Philemon Chavrier, Lyons (FR); Renaud Laperriere, Lyons (FR); Olivier Poussin, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 220 days.

(21) Appl. No.: 18/312,716

(22) Filed: May 5, 2023

(65) Prior Publication Data

US 2023/0365110 A1 Nov. 16, 2023

(30) Foreign Application Priority Data

May 12, 2022 (EP) .................................... 22173057

(51) Int. Cl.
*B60T 8/58* (2006.01)
*B60T 8/171* (2006.01)
(Continued)

(52) U.S. Cl.
CPC ................ *B60T 8/58* (2013.01); *B60T 8/171* (2013.01); *B60T 8/172* (2013.01); *B60T 8/321* (2013.01);
(Continued)

(58) Field of Classification Search
CPC . B60T 8/58; B60T 8/171; B60T 8/172; B60T 8/321; B60T 2201/04;
(Continued)

(56) References Cited

U.S. PATENT DOCUMENTS 5,100,277 A * 3/1992 Musil ...................... E01C 19/48 414/334
2002/0182009 A1* 12/2002 Barnat .................... E01C 19/48 404/101
(Continued)

FOREIGN PATENT DOCUMENTS

DE 102007009860 A1 9/2008
EP 3872258 A1 9/2021
(Continued)

OTHER PUBLICATIONS

English Machine Translation WO2006098083A1 (Year: 2006).*
(Continued)

*Primary Examiner* — Andrew J Cromer
(74) *Attorney, Agent, or Firm* — Jeffri A. Kaminski; Venable LLP

(57) ABSTRACT

A method of operating a vehicle feeding material to a road finishing machine. The vehicle includes a vehicle retarding system controllable to retard the vehicle, and processing circuitry coupled to the vehicle retarding system. The method includes determining, by the processing circuitry, a slope inclination of a downward sloping road surface to be paved by the road finishing machine; determining, by the processing circuitry, a deceleration level of the vehicle for operating the vehicle at the downward sloping road surface while obtaining a mechanical connection between the vehicle and the road finishing machine when the road finishing machine paves the downward sloping road surface; determining, by the processing circuitry, a retardation power level of the vehicle retarding system based on the slope inclination of the downward sloping road surface for obtaining the deceleration level; and controlling, by the processing circuitry, the vehicle retarding system to apply the retardation power level for obtaining the deceleration level.

12 Claims, 3 Drawing Sheets

(51) Int. Cl.
*B60T 8/172* (2006.01)
*B60T 8/32* (2006.01)

(52) U.S. Cl.
CPC ....... *B60T 2201/04* (2013.01); *B60T 2210/20* (2013.01); *B60T 2250/00* (2013.01); *B60T 2250/02* (2013.01); *B60T 2250/04* (2013.01); *E01C 2301/02* (2013.01)

(58) Field of Classification Search
CPC ............. B60T 2210/20; B60T 2250/00; B60T 2250/02; B60T 2250/04; E01C 2301/02
See application file for complete search history.

(56) References Cited

U.S. PATENT DOCUMENTS

2014/0257656 A1* 9/2014 Schwartz .................. B60T 7/12 701/61
2018/0142427 A1 5/2018 Tkachenko et al.
2021/0262177 A1* 8/2021 Holfelder .............. E01C 19/006
2022/0024432 A1* 1/2022 Tagesson .............. B60L 3/0076

FOREIGN PATENT DOCUMENTS

WO WO-2006098083 A1 * 9/2006 .............. E02F 3/388
WO 2019209158 A1 10/2019

OTHER PUBLICATIONS

Extended European Search Report in corresponding European Application No. 22173057.5 dated Nover 7, 2022 (7 pages).
European Communication pursuant to Article 94(3) EPC dated Oct. 15, 2025 in corresponding European Patent Application No. 22173057.5, 5 pages.

* cited by examiner

METHOD OF OPERATING A VEHICLE FEEDING MATERIAL TO A ROAD FINISHING MACHINE

TECHNICAL FIELD

The present invention relates to a method of operating a vehicle feeding material to a road finishing machine. The road finishing machine is preferably an asphalt paving machine. The invention also relates to a vehicle retarding system for the vehicle feeding material to the road finishing machine, as well as a vehicle comprising such a vehicle retarding system.

BACKGROUND

During operation of a road finishing machine, e.g. an asphalt paving machine, the road finishing machine is driving behind a vehicle that continuously feeds material to the road finishing machine. Accordingly, and with reference to a road finishing machine in the form of an asphalt paving machine, the vehicle, which is preferably a truck, is feeding asphalt to the asphalt paving machine, which in turn distributes the asphalt on the road surface.

To achieve a good result, the asphalt paving machine should be operated at a steady and relatively slow speed. Hence, sudden acceleration and deceleration should preferably be avoided during the paving of the road surface. As such, the truck feeding the asphalt to the asphalt paving machine should also be operated in a steady and relatively slow speed, i.e. to follow the motion of the asphalt paving machine.

However, since the truck is conventionally manually operated by a driver, situations arises where it can be rather difficult to maintain the truck at a desired speed relative to the paving machine. For example, when paving a downward sloping road surface, a particular demand is placed on the driver to control the speed to ensure steady operation in conjunction with the road finishing machine.

It is therefore a desire to provide a method and a system that improves operation of a vehicle during operation in conjunction with a road finishing machine.

SUMMARY

It is thus an object of the present invention to at least partially overcome the above described deficiencies.

According to a first aspect, there is provided a method of operating a vehicle feeding material to a road finishing machine, the vehicle comprising a vehicle retarding system controllable to retard the vehicle, and processing circuitry coupled to the vehicle retarding system, the method comprising determining, by the processing circuitry, a slope inclination of a downward sloping road surface to be paved by the road finishing machine; determining, by the processing circuitry, a deceleration level of the vehicle for operating the vehicle at the downward sloping road surface while obtaining a mechanical connection between the vehicle and the road finishing machine when the road finishing machine paves the downward sloping road surface; determining, by the processing circuitry, a retardation power level of the vehicle retarding system based on the slope inclination of the downward sloping road surface for obtaining the deceleration level; and controlling, by the processing circuitry, the vehicle retarding system to apply a retardation power having the magnitude of the retardation power level.

The vehicle retarding system is preferably a brake system of the vehicle. For example, the vehicle retarding system may be formed by one of, or a combination of, an electric machine generating electric power during braking, one or more vehicle service brakes, an auxiliary vehicle brake, or a brake resistor. Hence, the skilled person can choose a desired brake system as vehicle retarding system as long as it is able to controllably retard the vehicle.

Further, and as described above, the processing circuitry is determining a retardation power level of the vehicle retarding system based on the slope inclination. Hence, if the slope is steep, the retardation power level should be higher to obtain the desired deceleration level compared to operation at a less steep slope. As such, the retardation power level is dependent on the slope inclination of the downward sloping road surface.

Moreover, the vehicle and the road finishing machine should be construed as being in mechanical connection with each other. This does not mean that they are fixated to each other, but rather that a front end of the road finishing machine is in abutment with a rear end of the vehicle. Hereby, a contact force between the road finishing machine and the vehicle should be present during operation of the vehicle formation, i.e. during operation of the vehicle and the road finishing machine. The force between the vehicle and the road finishing machine may vary. For example, the force is higher when the road finishing machine is not decelerating as much as the vehicle, i.e. the road finishing machine is here pushing the vehicle, compared to when the road finishing machine is decelerating more compared to the vehicle.

The processing circuitry may include a microprocessor, microcontroller, programmable digital signal processor or another programmable device. The processing circuitry may also, or instead, each include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with a control unit of the vehicle.

The present invention is based on the insight that the interaction between the vehicle and road finishing machine, as well as taking the slope inclination into account, a smooth retardation of the vehicle can be obtained. An advantage is thus that the vehicle will not be exposed to sudden acceleration or deceleration and can supply material to the road finishing machine in a desired manner. Also, the present invention enables for an automated retardation action by the vehicle, thereby putting less strain to the operator of the vehicle who can instead focus on driving the vehicle in the desired direction, i.e. keeping sight in a forward direction. As the road finishing machine is in mechanical contact with the vehicle, the speed of the road finishing machine is hereby continuous, resulting in an improved paving of the road surface.

According to an example embodiment, the vehicle may feed material to the road finishing machine simultaneous to the vehicle retarding system applies the retardation power level. Hence, the vehicle retarding system is operated while feeding material to the road finishing machine.

According to an example embodiment, the step of controlling the vehicle retarding system to apply the retardation power level may be followed by the steps of determining, by the processing circuitry, a desired vehicle speed of the vehicle; and determining, by the processing circuitry, the deceleration level of the vehicle based on the desired vehicle speed. Hereby, a closed loop control is provided in which the desired speed of the vehicle is given as an input parameter for determining the deceleration level.

According to an example embodiment, the method may further comprise determining, by the processing circuitry, a current weight of the vehicle; wherein the retardation power level of the vehicle retarding system is based on the current weight of the vehicle. Hereby, a further input parameter can be provided to the processing circuitry. The accuracy of the retardation power level may hereby be even further improved. In detail, the retardation power level is increased for a heavy vehicle compared to a less heavy vehicle. When the vehicle feeds material to the road finishing machine, the weight will be reduced during operation and the retardation power level will hence also be reduced.

According to an example embodiment, the method may further comprise determining, by the processing circuitry, a maximum allowable retardation power level of the vehicle retarding system; wherein the retardation power level of the vehicle retarding system is based on the maximum allowable retardation power level. The maximum allowable retardation power level should be construed as the maximum level the retarding system is able to generate. If the retardation power level should exceed the maximum allowable retardation power level, a warning signal should be issued to the operator since this might result in a dangerous situation where the vehicle speed is unable to be sufficiently reduced. The operator of the vehicle may hereby take control of the vehicle and correct the potentially dangerous situation.

According to an example embodiment, the method may further comprise determining, by the processing circuitry, a speed variation of the vehicle when the vehicle retarding system is controlled to apply the retardation power level; comparing, by the processing circuitry, the speed variation with a predetermined speed variation range; and controlling, by the processing circuitry, the vehicle retarding system to adjust the retardation power level when the speed variation falls outside the predetermined speed variation range.

An advantage is that, in the event the vehicle is accelerating and decelerating too excessively, the processing circuitry can actively control the vehicle retarding system to adjust the retardation power level to acceptable limits. The vehicle speed will thus be kept as constant as possible, which in turn will reduce the risk of system damages.

Accordingly, and according to an example embodiment, the retardation power level may be adjusted such that a speed of the vehicle falls within the predetermined speed variation range.

According to an example embodiment, the processing circuitry may be configured to determine the deceleration level of the vehicle for operating the vehicle at the desired speed by wirelessly receiving a signal from a remote server. Thus, the deceleration level may be determined remotely from a server or from an operator standing next to the road at which the vehicle and the road finishing machine is operating. In such a case, the server or the operator can receive an input signal from the vehicle with data relating to the desired speed.

According to an example embodiment, the vehicle may comprise a plurality of vehicle retarding systems, each of the plurality of vehicle retarding systems being operable to apply a retarding force on a respective wheel axle of the vehicle, wherein the retardation power level is based on a number of vehicle retarding systems provided on the vehicle. Hence, different brake systems or different brakes may in combination provide a braking action to obtain the desired overall retardation power level.

According to a second aspect, there is provided a vehicle retarding system for a vehicle configured to feed material to a road finishing machine, the vehicle retarding system being configured to retard the vehicle when feeding material to the road finishing machine, wherein the vehicle retarding system comprises a control unit comprising processing circuitry coupled to the vehicle retarding system, the processing circuitry being configured to determine a slope inclination of a downward sloping road surface to be paved by the road finishing machine; determine a deceleration level of the vehicle for operating the vehicle at the downward sloping road surface while obtaining a mechanical connection between the vehicle and the road finishing machine when the road finishing machine paves the downward sloping road surface; determine a retardation power level of the vehicle retarding system based on the slope inclination of the downward sloping road surface for obtaining the deceleration level; and control the vehicle retarding system to apply a retardation power having the magnitude of the retardation power level.

Effects and features of the second aspect are largely analogous to those described above in relation to the first aspect.

According to a third aspect, there is provided a vehicle comprising a vehicle retarding system according to the above described second aspect.

According to a fourth aspect, there is provided a computer program comprising program code means for performing the steps of any one of the above described example embodiments of the first aspect when the program is run on a computer.

According to a fifth aspect, there is provided a computer readable medium carrying a computer program comprising program means for performing the steps of any one of the above described example embodiments of the first aspect when the program means is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
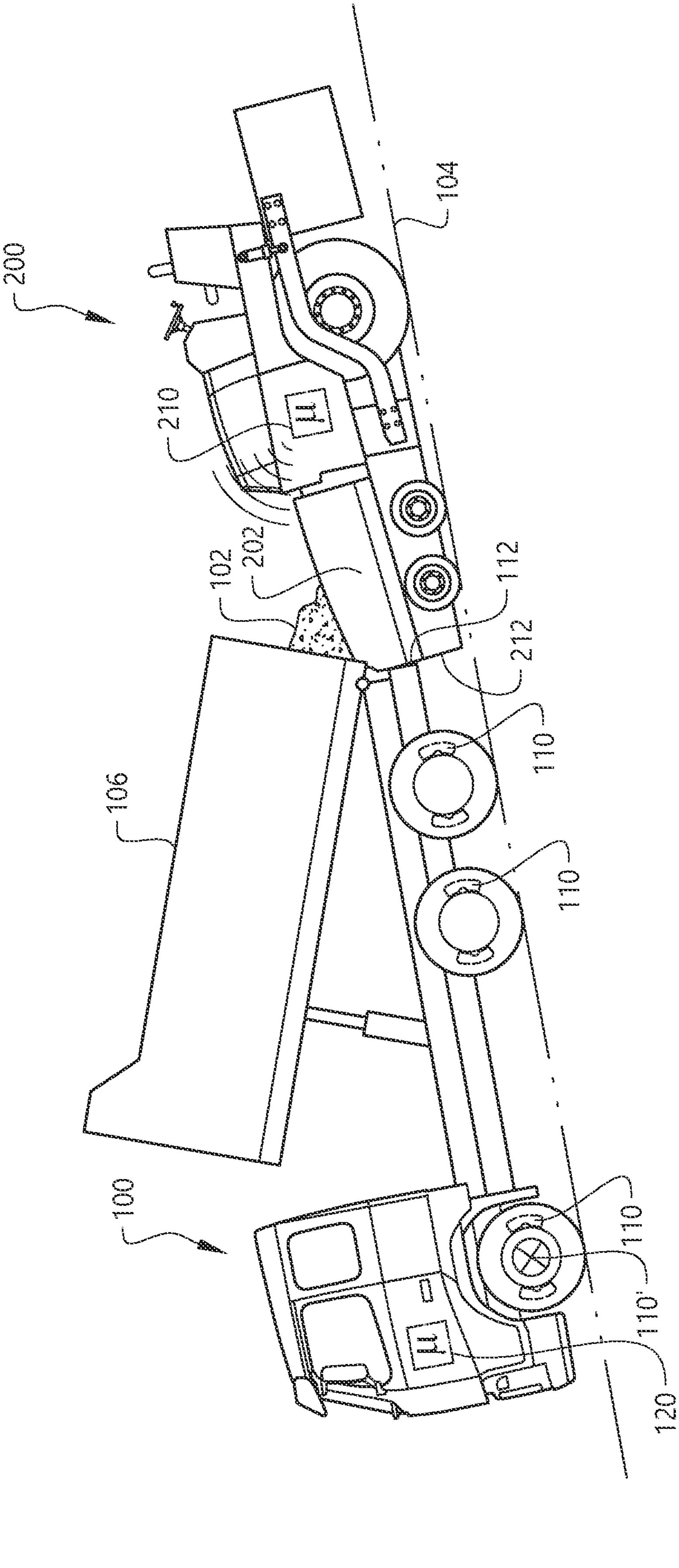
FIG. 1 is a lateral side view illustrating an example embodiment of a vehicle feeding material to a road finishing machine.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

With particular reference to FIG. 1, there is depicted a vehicle combination comprising a vehicle 100 and a road finishing machine 200 during operation. In particular, FIG. 1 illustrates an example embodiment of the vehicle 100 feeding material 102 to the road finishing machine 200, wherein the road finishing machine 200 is configured to distribute the material 102 along the road surface 104.

The vehicle 100 is exemplified as a truck comprising a container 106 with the material to be fed to the road finishing machine 200. During operation, i.e. when the vehicle feeds the material 102 to the road finishing machine 200, the container 106 is tilted around a pivot joint 108 at a rear end 112 of the vehicle 100 such that the material can slide out from the container 106 and into a material receiver 202 of the road finishing machine 200.

The vehicle 100 can be propelled by any type of prime mover, such as e.g. an internal combustion engine (not shown), an electric machine 110', ora combination of an internal combustion engine and an electric machine 110', i.e. a hybrid vehicle. In a similar vein, the road finishing machine 200 can also be propelled by any type of prime mover, such as e.g. an internal combustion engine, an electric machine, or a combination of an internal combustion engine and an electric machine, i.e. a hybrid vehicle.

The vehicle 100 further comprises a vehicle retarding system 110, 110'. The vehicle retarding system 110, 110' is configured to retard the vehicle 100 during operation. In detail, the retarding system 110, 110' is configured to control the vehicle speed, in particular during operation in a downward sloping road surface. The vehicle retarding system is thus preferably a brake system of the vehicle. As exemplified in FIG. 1, the vehicle retarding system 110, 110' may be one or more of the vehicle service brakes 110 or the electric machine 110' when the vehicle is propelled by such electric machine 110'. In the latter example, the electric machine 110' is thus, during braking, generating electric power which is fed to e.g. an energy storage system of the vehicle 100. Although not depicted, the vehicle retarding system may also be formed by other vehicle components, such as e.g. an auxiliary vehicle brake, a brake resistor, etc. Accordingly, the vehicle 100 may comprise a plurality of vehicle retarding systems, wherein each of the vehicle retarding systems is arranged to apply a retarding force for controlling the speed of the vehicle 100.

The vehicle 100 also comprises a control unit 120. The control unit 120 comprises processing circuitry coupled to the vehicle retarding system 110, 110'. The processing circuitry is thus configured to control a retardation power level of the vehicle retarding system 110, 110' for controlling the speed of the vehicle. Hence, the processing circuitry is configured to control the vehicle retarding system 110, 110' such that the vehicle 100 obtains a desired deceleration level. The road finishing machine 200 also comprises a control unit 210. The control unit 210 of the road finishing machine 200 also comprises processing circuitry as well as a transmitted configured to transmit signal(s) to the control unit 120 of the vehicle 100.

During operation as depicted in FIG. 1, the vehicle 100 and the road finishing machine 200 should preferably keep the same speed such that a front end 212 of the road finishing machine 200 is in mechanical connection with the rear end 112 of the vehicle 100 when material is fed from the container 106 to the material receiver 202 of the road finishing machine 200. Hence, the front end 212 of the road finishing machine 200 is continuously in abutment with the rear end 112 of the vehicle 100 such that a contact force is obtained there between.

Figure 2:
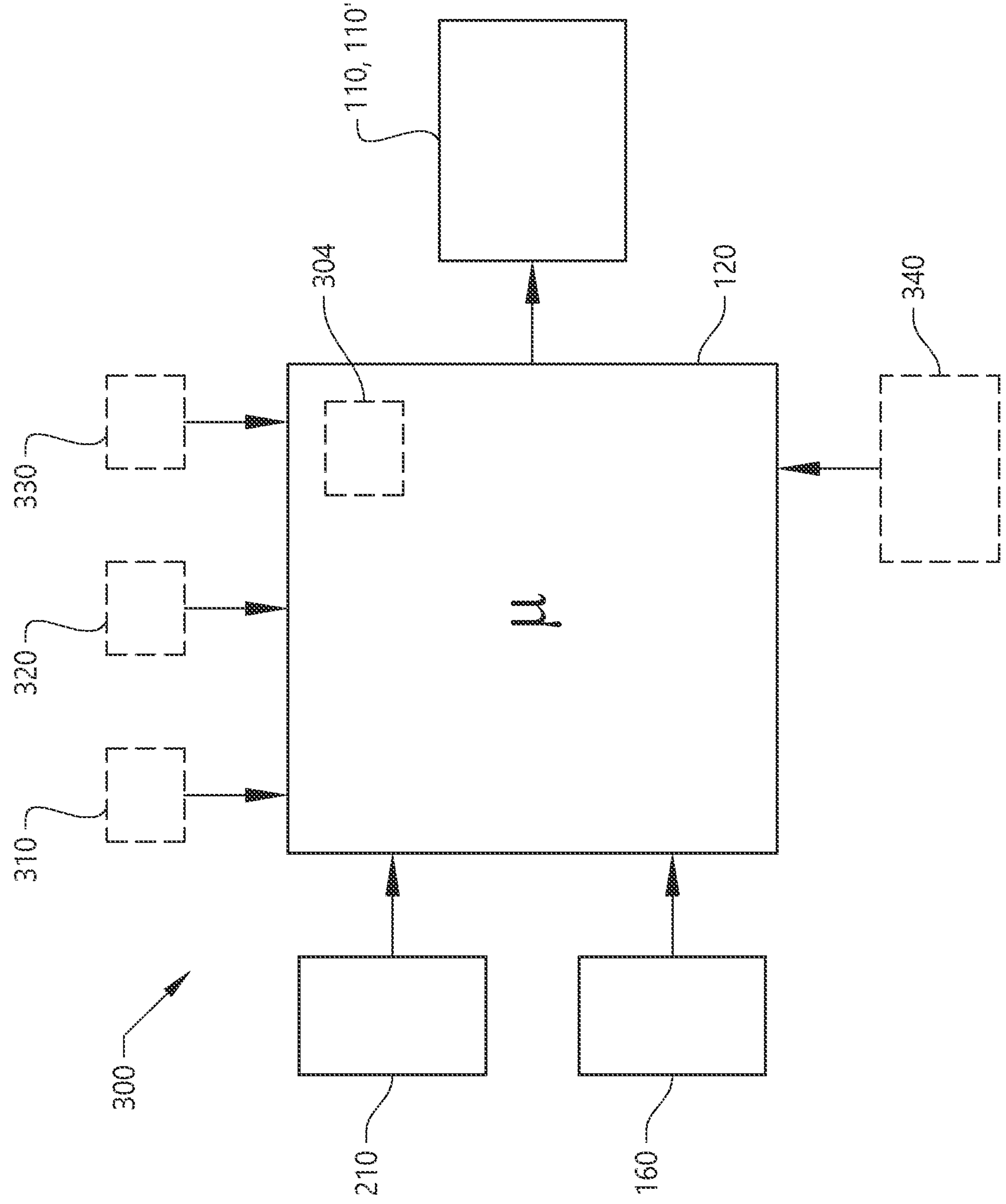
FIG. 2 is a schematic illustration of a computer system according to an example embodiment.
Figure 3:
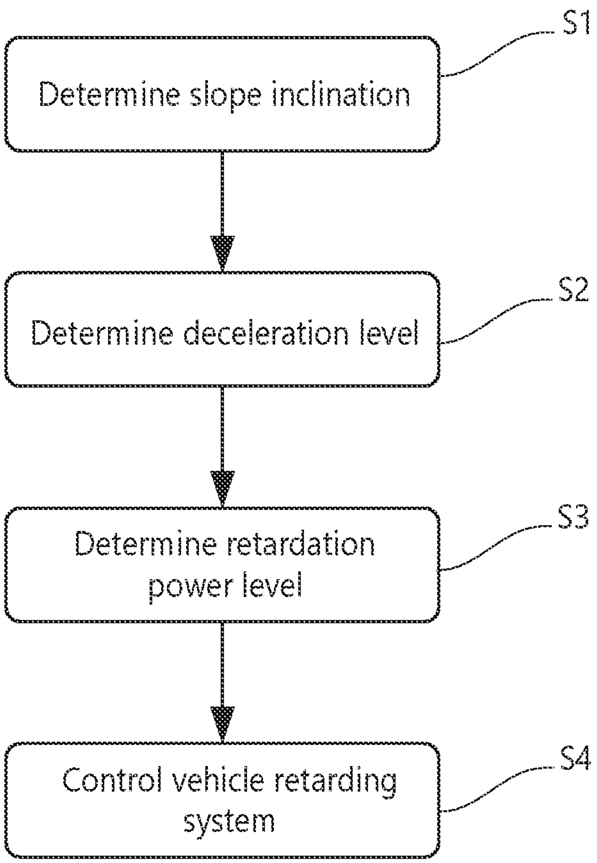
FIG. 3 is a flow chart of a method of operating a vehicle feeding material to a road finishing machine according to an example embodiment.

In order to describe the operation of the vehicle combination in the downward sloping road surface, reference is now made to FIGS. 2 and 3. FIG. 2 is a schematic illustration of a computer system 300 according to an example embodiment and FIG. 3 is a flow chart of a method of operating the vehicle 100 feeding material to the road finishing machine 200 according to an example embodiment.

Accordingly, FIG. 2 is a schematic diagram of a computer system 300 (also in the following referred to as "computing device") for implementing examples disclosed herein. The computer system 300 is adapted to execute instructions from a computer-readable medium to perform these and/or any of the functions or processing described herein. The computer system 300 may be connected (e.g., networked) to other machines in a LAN, an intranet, an extranet, or the Internet. While only a single device is illustrated, the computer system 300 may include any collection of devices that individually or jointly execute a set (or multiple sets) of instructions to perform any one or more of the methodologies discussed herein.

The computer system 300 may comprise any computing or electronic device capable of including firmware, hardware, and/or executing software instructions to implement the functionality described herein. The computer system 300 includes a control unit 120 provided with processing circuitry, a memory 304, and a system bus (not shown). The system bus provides an interface for system components including, but not limited to, the memory 304 and the control unit 120. The control unit 120 may include any number of hardware components for conducting data or signal processing or for executing computer code stored in memory 304. The control unit 120 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The control unit 120 may further include computer executable code that controls operation of the programmable device.

The system bus may be any of several types of bus structures that may further interconnect to a memory bus (with or without a memory controller), a peripheral bus, and/or a local bus using any of a variety of bus architectures. The memory 304 may be one or more devices for storing data and/or computer code for completing or facilitating methods described herein. The memory 304 may include database components, object code components, script components, or other types of information structure for supporting the various activities herein. Any distributed or local memory device may be utilized with the systems and methods of this description. The memory 304 may be communicably connected to the control unit 120 (e.g., via a circuit or any other wired, wireless, or network connection) and may include computer code for executing one or more processes described herein. The memory 304 may include non-volatile memory (e.g., read-only memory (ROM), erasable programmable read-only memory (EPROM), electrically erasable programmable read-only memory (EEPROM), etc.), and volatile memory (e.g., random-access memory (RAM)), or any other medium which can be used to carry or store desired program code in the form of machine-executable instructions or data structures, and which can be accessed by a computer or other machine with a control unit. A basic input/output system (BIOS) may be stored in the non-volatile memory and can include the basic routines that help to transfer information between elements within the computer system 300.

The computing device 300 may further include or be coupled to a non-transitory computer-readable storage medium such as the storage device, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device and other drives associated with computer-readable media and computer-usable media may provide non-volatile storage of data, data structures, computer-executable instructions, and the like.

A number of modules can be stored in the storage device and in the volatile memory, including an operating system and one or more program modules, which may implement the functionality described herein in whole or in part. All or a portion of the examples disclosed herein may be implemented as a computer program product stored on a transitory or non-transitory computer-usable or computer-readable storage medium (i.e., single medium or multiple media), such as the storage device, which includes complex programming instructions, such as complex computer-readable program code, to cause the control unit 120 to carry out the steps described herein. Thus, the computer-readable program code can comprise software instructions for implementing the functionality of the examples described herein when executed by the control unit 120. The control unit 120 may serve as a controller, or control system, for the computing device 300 that is to implement the functionality described herein.

The computer system 300 also may include an input device interface (e.g., input device interface and/or output device interface). The input device interface may be configured to receive input and selections to be communicated to the computer system 300 when executing instructions, such as from a keyboard, mouse, touch-sensitive surface, etc. Such input devices may be connected to the control unit 120 through the input device interface coupled to the system bus but can be connected through other interfaces such as a parallel port, an Institute of Electrical and Electronic Engineers (IEEE) 1394 serial port, a Universal Serial Bus (USB) port, an IR interface, and the like. The computer system 300 may include an output device interface Z24 configured to forward output, such as to a display, a video display unit (e.g., a liquid crystal display (LCD) or a cathode ray tube (CRT)). The computing device 300 may also include a communications interface suitable for communicating with a network as appropriate or desired.

The operational steps described in any of the exemplary embodiments herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

When the vehicle combination is operating in the downward sloping road surface, i.e. the road finishing machine 200 is supplying material to the road, a signal is received by the processing circuitry from e.g. an inclination sensor 160, which signal is indicative of a slope inclination of the downward sloping surface, i.e. the processing circuitry determines S1 the slope inclination of the downward sloping surface to be paved by the road finishing machine. The inclination sensor 160 is preferably connected to the vehicle 100. As an alternative, the inclination sensor 160 may be arranged on the road finishing machine 200, whereby the control unit 210 of the road finishing machine 200 wirelessly transmits the signal indicative of the slope inclination to the processing circuitry of the vehicle control unit 120.

The processing circuitry determines S2 a deceleration level of the vehicle 100 for operating the vehicle at the downward sloping road surface while obtaining a mechanical connection between the vehicle and the road finishing machine when the road finishing machine paves the downward sloping road surface. For operating the vehicle 100 to obtain the deceleration level, the processing circuitry determines S3 a retardation power level of the vehicle retarding system 110, 110' based on the slope inclination of the downward sloping road surface for obtaining the deceleration level. As described above, the vehicle 100 may comprise a plurality of vehicle retarding systems 110, 110'. In such case, the retardation power level is based on the number of vehicle retarding systems provided on the vehicle 100.

The processing circuitry thereafter controls S4 the vehicle retarding system 110, 110' to apply the retardation power level for decelerating the vehicle accordingly. In detail, the processing circuitry transmits a control signal to a vehicle retarding system control unit (not shown), wherein the signal contains instructions which, when received by the vehicle retarding system control unit, enables the vehicle retarding system control unit to apply the determined retardation power level on the vehicle retarding system 110, 110'.

In addition to the above described method, the processing circuitry may, as a non-limiting example, determine the retardation power level also based on the current weight of the vehicle 100. The vehicle 100 may thus comprise a weight sensor 310 which measures the weight of the vehicle and transmits a signal indicative of the weight to the processing circuitry. Since the vehicle 100 is feeding material to the road finishing machine, the weight may continuously vary, i.e. be reduced during operation, and increased when new material is fed into the container 106.

As a further non-limiting alternative, the processing circuitry may receive a signal indicative of a maximum allowable retardation power level of the vehicle retarding system 110, 110'. This signal may be received from a retarder ability module 320 which is configured to determine the maximum braking ability of the vehicle retarding system 110, 110'. Based on the signal received from the retarder ability module 320, the processing circuitry may, in addition to the above described features, determine the retardation power level. In detail, should the retardation power level exceed the maximum braking ability, an alarm signal is triggered, and the operator can intervene.

Moreover, as a still further non-limiting example, the processing circuitry may be configured to determine a speed variation of the vehicle 100 when the vehicle retarding system is controlled to apply the retardation power level. The speed variation may be received from a speed sensor 330 of the vehicle 100. The processing circuitry may hereby compare the speed variation, i.e. how much the vehicle accelerates/decelerates during a predetermined time period, with a predetermined speed variation range. When the speed variation falls outside the predetermined speed variation range, the processing circuitry controls the vehicle retarding system to adjust the retardation power level. In particular, when the speed variation is above an upper limit of the predetermined speed variation range, the retardation power level is increased to reduce the speed of the vehicle 100, and when the speed variation is below a lower limit of the predetermined speed variation range, the retardation power level is reduced to increase the speed of the vehicle 100.

Still further, the processing circuitry may receive a signal from a remote server 340. The remote serve 340 may provide data relating to the vehicle speed of the vehicle 100. Hereby, the speed of the vehicle 100 may also be controlled by the remote server 340. In detail, the remote server 340 transmits a control signal to the control unit 120 of the vehicle 100 which is indicative of the desired speed at which the vehicle 100 should be operated. This may be particularly advantageous when the road finishing machine 200 is autonomously controlled.

As another alternative, the step of controlling the vehicle retarding system to apply the retardation power level may followed by the steps of determining, by the processing circuitry, a desired vehicle speed of the vehicle; and determining, by the processing circuitry, the deceleration level of the vehicle based on the desired vehicle speed. Hereby, a closed loop control is provided in which the desired speed of the vehicle is given as an input parameter for determining the deceleration level.

It is to be understood that the present disclosure is not limited to the embodiments described above and illustrated in the drawings; rather, the skilled person will recognize that many changes and modifications may be made within the scope of the appended claims.

The invention claimed is:

1. A method of operating a vehicle feeding material to a road finishing machine, the vehicle comprising a vehicle retarding system controllable to retard the vehicle, and processing circuitry coupled to the vehicle retarding system, the method comprising:

determining, by the processing circuitry, a slope inclination of a downward sloping road surface to be paved by the road finishing machine;

determining, by the processing circuitry, a deceleration level of the vehicle for operating the vehicle at the downward sloping road surface while obtaining continuous a non-fixed mechanical abutment connection providing a contact force between a rear end of vehicle and a front end of the road finishing machine while the road finishing machine pushes the vehicle when the road finishing machine paves the downward sloping road surface;

determining, by the processing circuitry, a retardation power level of the vehicle retarding system based on the slope inclination of the downward sloping road surface for obtaining the deceleration level; and controlling, by the processing circuitry, the vehicle retarding system to apply a retardation having a magnitude of the retardation power level.

2. The method according to claim 1, wherein the vehicle feeds material to the road finishing machine simultaneous to the vehicle retarding system applies the retardation power level.

3. The method according to claim 1, wherein the step of controlling the vehicle retarding system to apply the retardation power level is followed by the steps of:

determining, by the processing circuitry, a desired vehicle speed of the vehicle; and determining, by the processing circuitry, the deceleration level of the vehicle based on the desired vehicle speed.

4. The method according to claim 1, wherein the method further comprises:

determining, by the processing circuitry, a current weight of the vehicle;

wherein the retardation power level of the vehicle retarding system is based on the current weight of the vehicle.

5. The method according to claim 1, wherein the method further comprises:

determining, by the processing circuitry, a maximum allowable retardation power level of the vehicle retarding system;

wherein the retardation power level of the vehicle retarding system is based on the maximum allowable retardation power level.

6. The method according to claim 1, wherein the method further comprises:

determining, by the processing circuitry, a speed variation of the vehicle when the vehicle retarding system is controlled to apply the retardation power level;

comparing, by the processing circuitry, the speed variation with a predetermined speed variation range; and controlling, by the processing circuitry, the vehicle retarding system to adjust the retardation power level when the speed variation falls outside the predetermined speed variation range.

7. The method according to claim 6, wherein the retardation power level is adjusted such that a speed of the vehicle falls within the predetermined speed variation range.

8. The method according to claim 1, wherein the processing circuitry is configured to determine the deceleration level of the vehicle for operating the vehicle at a desired speed by wirelessly receiving a signal from a remote server.

9. The method according to claim 1, wherein the vehicle comprises a plurality of vehicle retarding systems, each of the plurality of vehicle retarding systems being operable to apply a retarding force on a respective wheel axle of the vehicle, wherein the retardation power level is based on a number of vehicle retarding systems provided on the vehicle.

10. A vehicle retarding system for a vehicle configured to feed material to a road finishing machine, the vehicle retarding system being configured to retard the vehicle when feeding material to the road finishing machine, wherein the vehicle retarding system comprises a control unit comprising processing circuitry coupled to the vehicle retarding system, the processing circuitry being configured to:

determine a slope inclination of a downward sloping road surface to be paved by the road finishing machine;

determine a deceleration level of the vehicle for operating the vehicle at the downward sloping road surface while obtaining continuous a non-fixed mechanical abutment connection providing a contact force between a rear end of the vehicle and a front end of the road finishing machine while the road finishing machine pushes the vehicle when the road finishing machine paves the downward sloping road surface;

determine a retardation power level of the vehicle retarding system based on the slope inclination of the downward sloping road surface for obtaining the deceleration level; and control the vehicle retarding system to apply a retardation power having a magnitude of the retardation power level.

11. A vehicle comprising the vehicle retarding system according to claim 10.

12. A non-transitory computer readable medium carrying a computer program comprising program code for performing the steps of claim 1 when the program code is run on a computer.

* * * * *